US010163233B2

(12) United States Patent
Ding et al.

(10) Patent No.: US 10,163,233 B2
(45) Date of Patent: *Dec. 25, 2018

(54) IMAGE RECONSTRUCTION

(71) Applicant: Shenyang Neusoft Medical Systems Co., Ltd., Shenyang (CN)

(72) Inventors: Haoda Ding, Shenyang (CN); Hongyu Guo, Shenyang (CN); Hongbing Hu, Shenyang (CN)

(73) Assignee: Shenyang Neusoft Medical Systems Co., Ltd., Shenyang (CN)

(*) Notice: Subject to any disclaimer, the term of this patent is extended or adjusted under 35 U.S.C. 154(b) by 176 days.

This patent is subject to a terminal disclaimer.

(21) Appl. No.: 15/366,781

(22) Filed: Dec. 1, 2016

(65) Prior Publication Data

US 2017/0169589 A1 Jun. 15, 2017

(30) Foreign Application Priority Data

Dec. 11, 2015 (CN) .......................... 2015 1 0925600

(51) Int. Cl.
*G06K 9/00* (2006.01)
*G06T 11/00* (2006.01)
*G06T 5/00* (2006.01)

(52) U.S. Cl.
CPC ............ *G06T 11/008* (2013.01); *G06T 5/006* (2013.01); *G06T 2207/10072* (2013.01);
(Continued)

(58) Field of Classification Search
CPC ...... G06T 11/008; G06T 11/003; G06T 5/006
(Continued)

(56) References Cited

U.S. PATENT DOCUMENTS 7,583,778 B2   9/2009 Mori
8,218,715 B2   7/2012 Sauer et al.
(Continued)

FOREIGN PATENT DOCUMENTS

CN   102105106 A   6/2011
CN   103052972 A1  4/2013
(Continued)

OTHER PUBLICATIONS

Zou Jing et al.; A Fast Iterative Image Reconstruction Algorithm from Few-views Progections Data; Acta Optica Sinica, 2009 V29, p. 1198-1204.
(Continued)

*Primary Examiner* — Van D Huynh
(74) *Attorney, Agent, or Firm* — Fish & Richardson P.C.

(57) ABSTRACT

Methods and apparatus, including computer programs encoded on a computer storage medium, for image reconstruction are provided. According to an example of the methods, an image reconstruction may be performed to generate a first set of reconstructed data with a first set of projection data comprising a plurality of first projection data each corresponding to a respective projection angle of a plurality of projection angles. A second set of projection data comprising second projection data for each projection angle may be generated with the first set of reconstructed data. The first set of projection data may be corrected based on a shifting distance between the first projection data and the second projection data for each projection angle. Then, a second set of reconstructed data may be generated with the corrected first set of projection data, and a reconstructed image may be generated according to the second set of reconstructed data.

20 Claims, 9 Drawing Sheets

(52) U.S. Cl.
CPC ............ *G06T 2207/20056* (2013.01); *G06T 2207/30004* (2013.01); *G06T 2211/436* (2013.01)

(58) Field of Classification Search
USPC ...................................................... 382/131
See application file for complete search history.

(56) References Cited

U.S. PATENT DOCUMENTS

| | | | |
|---|---|---|---|
| 2006/0056578 A1 | 3/2006 | Rubin et al. | |
| 2007/0075249 A1* | 4/2007 | Wang | G06T 11/006 250/363.04 |
| 2011/0085718 A1* | 4/2011 | Ingerman | G01N 23/046 382/131 |
| 2011/0096971 A1 | 4/2011 | Shechter | |
| 2011/0286573 A1 | 11/2011 | Schretter et al. | |
| 2012/0128265 A1 | 5/2012 | Silver et al. | |
| 2013/0051519 A1 | 2/2013 | Yang et al. | |
| 2013/0294568 A1* | 11/2013 | Lee | G06T 5/50 378/4 |
| 2014/0307934 A1* | 10/2014 | Batenburg | G06T 11/005 382/131 |
| 2015/0103968 A1 | 4/2015 | Chen et al. | |
| 2015/0139526 A1 | 5/2015 | Jeong et al. | |
| 2015/0243045 A1* | 8/2015 | Ra | A61B 6/032 382/131 |
| 2015/0323474 A1 | 11/2015 | Case et al. | |
| 2015/0356712 A1 | 12/2015 | Stayman et al. | |

FOREIGN PATENT DOCUMENTS

| | | |
|---|---|---|
| CN | 103136773 A | 6/2013 |
| CN | 103310432 A | 9/2013 |
| CN | 103745488 A | 4/2014 |
| CN | 104167007 A | 11/2014 |
| CN | 104200500 A | 12/2014 |
| CN | 104323789 A | 2/2015 |
| EP | 1531426 A1 | 5/2005 |
| EP | 2720062 A1 | 4/2014 |
| JP | 2010-155020 A | 7/2010 |
| WO | 2004081877 A1 | 9/2004 |
| WO | 2005076221 A1 | 8/2005 |

OTHER PUBLICATIONS

Gao Xin et al.; Fast iterative algorithm for image reconstruction from incomplete projections; Journal of Zhejiang University (Engineering Science), 2004 V38, p. 1108-1111.

Yang Min et al.; Three Dimensional Computed Tomography Based on Cone-beam Scanning and Its Engineering Application; CT Theory and Applications 2004 vol. 13.

Kudo H; Saito T; "A Tomographic Image Reconstruction From Limited View Angle Projection Data," Systems & Computers in Japan, Jul. 1, 1988 Wiley, Hoboken, NJ, US—ISSN 0882-1666; vol. 19, No. 7, pp. 56-64.

Tasto M; "A Probabilistic Object Model for Computerized Transverse Axial Tomography" Institut of Electrical and Electronics Engineers. Proceedings of the second International joint conference on Pattern recognition; Aug. 13-15, 1974, Copenhagen, Proc. 2, Aug. 13, 1974; pp. 396-397.

Wang G; Vannier M W; "Preliminary Study on Helical CT Algorithms for Patient Motion Estimation and Compensation" IEEE Transactions on Medical Imaging, Jun. 1, 1995 IEEE Service Center, Piscataway, NJ, US—ISSN 0278-0062; vol. 14, No. 2, pp. 205-211.

European Patent Office; European Search Report mailed in corresponding European Patent Application No. 16201077.1 dated May 18, 2017 (9 pages).

State Intellectual Property Office of the People's Republic of China, Office Action and Search Report Issued in Application No. 201510920976.5, dated Oct. 17, 2017, 9 pages (with English-language translation, 13 pages).

State Intellectual Property Office of the People's Republic of China, Office Action Issued in Application No. 201510925600.3, dated Nov. 1, 2017, 9 pages (with English-language translation, 10 pages).

Kudo H; Saito T; XP000050532—"A Tomographic Image Reconstruction From Limited View Angle Projection Data," Systems & Computers in Japan, Jul. 1, 1988 Wiley, Hoboken, NJ, US—ISSN 0882-1666; vol. 19, No. 7, pp. 56-64.

Tasto M; XP001378035—"A Probabilistic Object Model for Computerized Transverse Axial Tomography" Institut of Electrical and Electronics Engineers. Proceedings of the second International joint conference on Pattern recognition; Aug. 13-15, 1974, Copenhagen, Proc. 2, Aug. 13, 1974; pp. 396-397.

XP000520932; Wang G; Vannier M W; "Preliminary Study on Helical CT Algorithms for Patient Motion Estimation and Compensation" IEEE Transactions on Medical Imaging, Jun. 1, 1995 IEEE Service Center, Piscataway, NJ, US—ISSN 0278-0062; vol. 14, No. 2, pp. 205-211.

EPO Extended European Search Report for EP App. No. 16202173.7, dated Jun. 1, 2017 (10 pages).

EPO Extended European Search Report for EP App. No. 16201077.1, dated May 18, 2017 (9 pages).

* cited by examiner

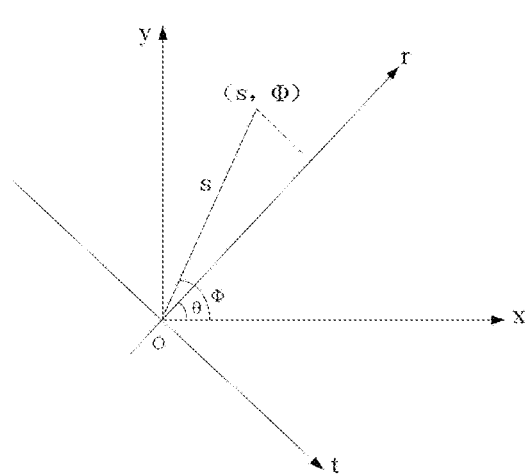
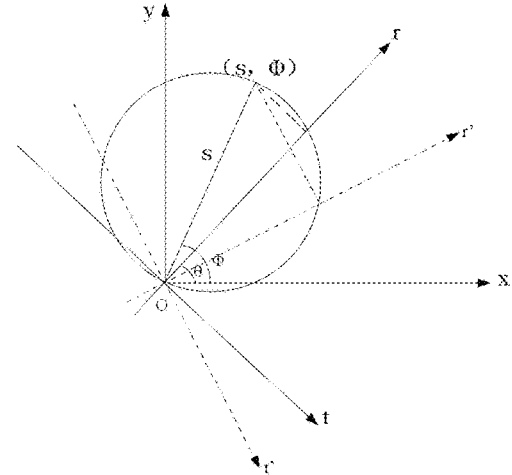
FIG. 1A                FIG. 1B
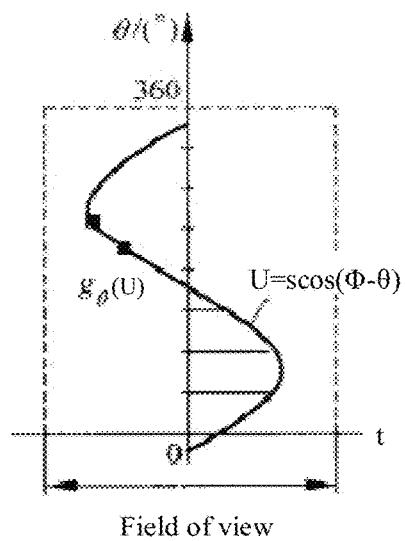
FIG. 1C

IMAGE RECONSTRUCTION

CROSS REFERENCE TO RELATED APPLICATIONS

This application claims priority under 35 U.S.C. § 119 to Chinese Patent Application No. 201510925600.3, filed on Dec. 11, 2015. The content of this priority application is hereby incorporated by reference in its entirety.

TECHNICAL FIELD

The present disclosure relates to reconstruction of medical image.

BACKGROUND

In the fields of medical imaging, after performing a scanning examination on patients by a medical device such as Computed Tomography (CT) or Magnetic Resonance Imaging (MRI) and so on, an image reconstruction may be performed on scanning data to generate an image to be viewed by doctors.

There are many methods for image reconstruction, such as direct back-projection algorithm, filtered back-projection (FBP) algorithm and direct Fourier transform algorithm. And in essence, an image reconstruction is performed to obtain pixel value in an image matrix according to gathered projection data to reconstruct an image. In the operating procedure of CT or a MRI device and so on, the projection data corresponding to a certain or some projection angles may shift due to electromagnetic interference or the like, which may cause strip artifacts to appear on a reconstructed image, and further may have a negative effect on accuracy of diagnosis according to the reconstructed images.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

One aspect of the present disclosure features a method of reconstructing image, comprising: accessing a first set of projection data that comprises a plurality of first projection data each corresponding to a respective projection angle of a plurality of projection angles; generating a first set of reconstructed data by image reconstruction with the first set of projection data; generating a second set of projection data by projection calculation according to the first set of reconstructed data, wherein the second set of projection data comprises a plurality of second projection data each corresponding to a respective projection angle of the plurality of projection angles; generating a third set of projection data by correcting the first projection data based on a shifting distance between the first projection data and the second projection data corresponding to each of the plurality of projection angles; and generating a second set of reconstructed data by image reconstruction with the third set of projection data. The method can further comprise generating a reconstructed image according to the second set of reconstructed data.

In some implementations, generating the third set of projection data comprises: constructing, for a projection angle, a cross-correlation function for first projection data and second projection data corresponding to the projection angle; determining the shifting distance between the first projection data and the second projection data corresponding to the projection angle according to a maximum value of the cross-correlation function; and obtaining projection data corresponding to the projection angle in the third set of projection data by shifting the first projection data corresponding to the projection angle with the shifting distance.

In some examples, the cross-correlation function can be:

$$\text{Corr}_\theta(r) = \text{iFFT}\{\text{FFT}[S_\theta(r)] \cdot \text{conj}[\text{FFT}(T_\theta(r))]\}$$

wherein $\text{Corr}_\theta(r)$ indicates a value of the cross-correlation function corresponding to a projection angle $\theta$, $S_\theta(r)$ indicates the first projection data corresponding to the projection angle $\theta$, $T_\theta(r)$ indicates the second projection data corresponding to the projection angle $\theta$, r indicates a deviation of the first projection data, FFT indicates a Fourier function, iFFT indicates an inverse Fourier function, and conj denotes conjugate.

In some examples, the cross-correlation function is:

$$\text{Corr}_\theta(r) = \frac{1}{N}\sum_{m=1}^{N} conj(T_\theta(m))S_\theta(r+m)$$

wherein $\text{Corr}_\theta(r)$ indicates a value of the cross-correlation function corresponding to a projection angle $\theta$, $S_\theta(m)$ indicates the $m^{th}$ first projection data corresponding to the projection angle $\theta$, $T_\theta(m)$ indicates the $m^{th}$ second projection data corresponding to the projection angle $\theta$, conj denotes conjugate, N indicates a quantity of the first projection data or the second projection data corresponding to the projection angle $\theta$, m indicates a serial number of the first projection data and the second projection data, and r indicates a deviation of the first projection data.

In some implementations, generating the third set of projection data comprises: shifting the first projection data corresponding to a projection angle a plurality of times at a preset step length; taking a shifting length corresponding to a maximum correlation between the shifted first projection data and the second projection data as the shifting distance between the first projection data and the second projection data corresponding to the projection angle, the shifting length being a particular number of times of the preset step length, the particular number being no more than a number of the plurality of times; and obtaining projection data corresponding to the projection angle in the third set of projection data by shifting the first projection data corresponding to the projection angle with the shifting distance.

In some examples, taking a shifting length corresponding to a maximum correlation between the shifted first projection data and the second projection data as the shifting distance between the first projection data and the second projection data corresponding to the projection angle comprises: determining, for each shifting, a correlation coefficient between a respective shifted first projection data and the second projection data corresponding to the projection angle; and taking a distance shifting from the first projection data corresponding to a maximum correlation coefficient as the shifting distance between the first projection data and the second projection data corresponding to the projection angle, the distance being the shifting length.

In some examples, taking a shifting length corresponding to a maximum correlation between the shifted first projection data and the second projection data as the shifting distance between the first projection data and the second projection data corresponding to the projection angle comprises: determining, for each shifting, a norm between a respective shifted first projection data and the second projection data corresponding to the projection angle, and taking a distance shifting from the first projection data corresponding to a minimum norm as the shifting distance between the first projection data and the second projection data corresponding to the projection angle, the distance being the shifting length.

In some implementations, the method further comprises: determining whether an iterative completion condition is fulfilled; if the iterative completion condition is not fulfilled, taking the second set of reconstructed data as a new first set of reconstructed data, and generating a new second set of reconstructed data based on the new first set of reconstructed data; and if the iterative completion condition is fulfilled, generating a reconstructed image according to the second set of reconstructed data. The iterative completion condition can comprise at least one of: a number of iterations reaching a preset value, or a difference between a second set of reconstructed data obtained in a previous iteration and a second set of reconstructed data obtained in a current iteration being no more than a preset threshold.

Another aspect of the present disclosure features an apparatus for image reconstruction, comprising: a processor; and a machine readable storage medium storing machine-executable instructions that correspond to a control logic for image reconstruction and upon such execution cause the processor to: access a first set of projection data that comprises a plurality of first projection data each corresponding to a respective projection angle of a plurality of projection angles; generate a first set of reconstructed data by image reconstruction with the first set of projection data; generate a second set of projection data by projection calculation according to the first set of reconstructed data, wherein the second set of projection data comprises a plurality of second projection data each corresponding to a respective projection angle of the plurality of projection angles; generate a third set of projection data by correcting the first projection data based on a shifting distance between the first projection data and the second projection data corresponding to each of the plurality of projection angles; and generate a second set of reconstructed data by image reconstruction with the third set of projection data.

In some implementations, the machine-executable instructions cause the processor to generate the third set of projection data by: constructing, for a projection angle, a cross-correlation function for first projection data and second projection data corresponding to the projection angle; determining the shifting distance between the first projection data and the second projection data corresponding to the projection angle according to a maximum value of the cross-correlation function; and obtaining projection data corresponding to the projection angle in the third set of projection data by shifting the first projection data corresponding to the projection angle with the shifting distance.

In some examples, the cross-correlation function is:

$$\mathrm{Corr}_\theta(r) = \mathrm{iFFT}\{\mathrm{FFT}[S_\theta(r)] \cdot \mathrm{conj}[\mathrm{FFT}(T_\theta(r))]\}$$

wherein $\mathrm{Corr}_\theta(r)$ indicates a value of the cross-correlation function corresponding to a projection angle $\theta$, $S_\theta(r)$ indicates the first projection data corresponding to the projection angle $\theta$, $T_\theta(r)$ indicates the second projection data corresponding to the projection angle $\theta$, r indicates a deviation of the first projection data, FFT indicates a Fourier function, iFFT indicates an inverse Fourier function, and conj denotes conjugate.

In some examples, the cross-correlation function is:

$$\mathrm{Corr}_\theta(r) = \frac{1}{N}\sum_{m=1}^{N} conj(T_\theta(m))S_\theta(r+m)$$

wherein $\mathrm{Corr}_\theta(r)$ indicates a value of the cross-correlation function corresponding to a projection angle $\theta$, $S_\theta(m)$ indicates $m^{th}$ first projection data corresponding to the projection angle $\theta$, $T_\theta(m)$ indicates $m^{th}$ second projection data corresponding to the projection angle $\theta$, conj denotes conjugate, N indicates a quantity of the first projection data or the second projection data corresponding to the projection angle $\theta$, m indicates a serial number of the first projection data and second projection data, and r indicates a deviation of the first projection data.

In some implementations, the machine-executable instructions cause the processor to generate the third set of projection data by: shifting, for a projection angle, corresponding first projection data a plurality of times at a preset step length, taking a shifting length corresponding to a maximum correlation between the shifted first projection data and the second projection data as the shifting distance between the first projection data and the second projection data corresponding to the projection angle, the shifting length being a particular number of times of the preset step length, the particular number being no more than a number of the plurality of times; and obtaining projection data corresponding to the projection angle in the third set of projection data by shifting the first projection data corresponding to the projection angle with the shifting distance.

In some examples, the machine-executable instructions cause the processor to take a shifting length corresponding to a maximum correlation between the shifted first projection data and the second projection data as the shifting distance between the first projection data and the second projection data by: determining, for each shifting, a correlation coefficient corresponding to the shifted first projection data and the second projection data; and taking a distance shifting from the first projection data corresponding to a maximum correlation coefficient as the shifting distance between the first projection data and the second projection data corresponding to the projection angle, the distance being the shifting length.

In some examples, the machine-executable instructions cause the processor to take a shifting distance corresponding to a maximum correlation between the shifted first projection data and the second projection data as the shifting distance between the first projection data and the second projection data corresponding to the projection angle by: determining, for each shifting, a norm corresponding to the shifted first projection data and the second projection data; and taking a distance shifting from the first projection data corresponding to a minimum norm as the shifting distance between the first projection data and the second projection data corresponding to the projection angle, the distance being the shifting length.

The machine-executable instructions can further cause the processor to generate a reconstructed image according to the second set of reconstructed data. The machine-executable instructions can further cause the processor to: determine whether an iterative completion condition is fulfilled; if the iterative completion condition is not fulfilled, take the second set of reconstructed data as a new first set of reconstructed data, and generate a new second set of reconstructed data based on the new first set of reconstructed data; and if the iterative completion condition is fulfilled, generate a reconstructed image according to the second set of reconstructed data. The iterative completion condition can comprise at least one of: a number of iterations reaching a preset value, or a difference between a second set of reconstructed data obtained in a previous iteration and a second set of reconstructed data obtained in a current iteration being no more than a preset threshold.

A further aspect of the present disclosure features a non-transitory computer readable storage medium storing instructions that are executable by a processor and upon such execution cause the processor to perform actions of the method mentioned above.

The details of one or more embodiments of the subject matter described in the present disclosure are set forth in the accompanying drawings and description below. Other features, aspects, and advantages of the subject matter will become apparent from the description, the drawings, and the claims.

BRIEF DESCRIPTION OF DRAWINGS

Features of the present disclosure are illustrated by way of example and not limited in the following figures, in which like numerals indicate like elements.

FIG. 1A is a principle diagram of projection of one point in space at a projection angle.

FIG. 1B is a principle diagram of projection of one point in space at a plurality of projection angles.

FIG. 1C is a schematic diagram of a sine curve formed by projection of one point in space at a plurality of projection angles.

DETAILED DESCRIPTION

First of all, principles of projection and image reconstruction are introduced as below before introducing the method for image reconstruction provided by the present disclosure.

Referring to FIG. 1A, a coordinate system composed of x-axis and y-axis is an image coordinate system, and a coordinate system composed of a t-axis and an r-axis is a projection coordinate system. The t-axis and straight lines in parallel with the t-axis may denote projection lines, the r-axis may denote a projection plane perpendicular to the projection lines, and an included angle θ between the r-axis and the x-axis may denote a projection angle. A polar coordinate (s, Φ) may be a position of any point in space, s may denote a distance from the point to coordinate origin O, and Φ may denote an included angle between a connecting line from this point to the coordinate origin O and the x-axis. A straight line passing through the point (s, Φ) and perpendicular to the r-axis may denote a projection line passing through the point, and an intersection point of the projection line and the r-axis may be a projection point.

In a process of projection of the point (s, Φ), the position of the r-axis may also constantly change as the projection angle changes, and the projection line passing through the point (s, Φ) may always be perpendicular to the r-axis. Therefore, referring to FIG. 1B, the position coordinates of the projection points may fall on a circle with a diameter of s. Thus, referring to FIG. 1C, it may be concluded that a connecting line $g_0(U)$ of corresponding projection points of each specific point in continuous 360-degree rotational scanning may be represented by a sine curve, where t represents the field, θ represents the projection angle, and U=s cos (Φ−θ) represents the corresponding projection point.

Figure 2A:
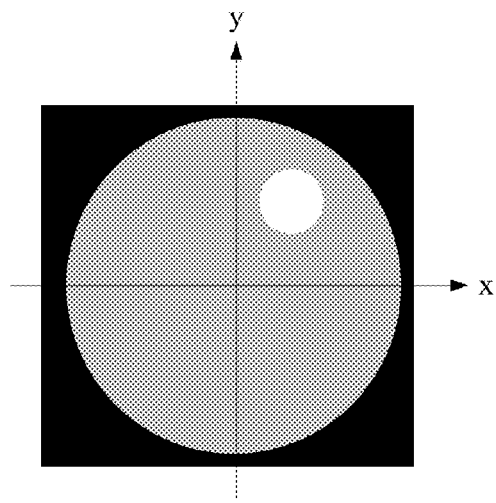
FIGS. 2A and 2B are diagrams of a projection point and a sinusoidal curve.
Figure 2B:
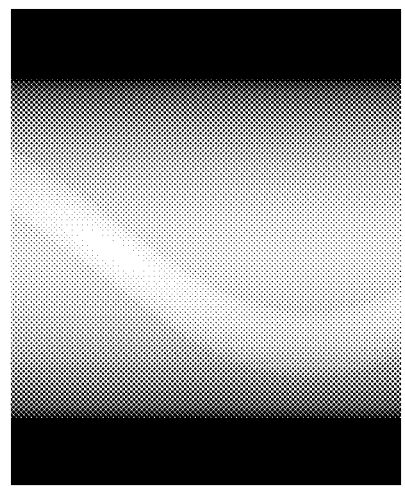

Referring to FIG. 2A, in which black, grey and white colors may be utilized to indicate densities of human body, assuming that black color indicates that the density of human body is 0, grey color indicates that the density of human body is 25, and white color indicates that the density of human body is 50. Supposing that the white point in FIG. 2A denotes a certain nidus of a human body, as illustrated in FIG. 2B, a sine curve may be formed by projection points obtained by irradiation of a projection line rotating 360 degrees.

Figure 3:
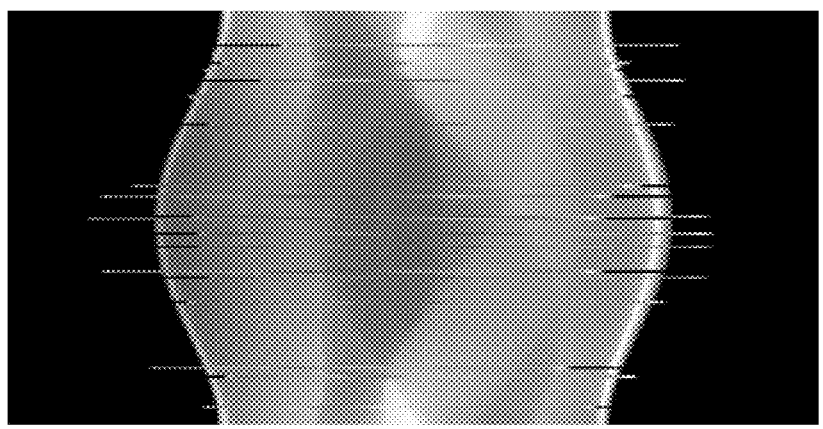
FIG. 3 is a projection diagram corresponding to brain projection data.

According to the above principles, a projection diagram of all the projection points may be obtained by projection scanning. FIG. 3 is a projection diagram drawn according to scanned data groups obtained by scanning a simulated brain. The figure may be formed by a plurality of sine curves with horizontal axis as projection data and vertical axis as projection angle. As can be seen from FIG. 3, electromagnetic interference may likely be generated in a running procedure of CT or a magnetic resonance receiver, which may cause projection data corresponding to a certain or some projection angle to deviate towards left or right relative to projection data under ideal conditions in a projection coordinate system, and thus may damage a smoothness of a sine curve.

Figure 4:
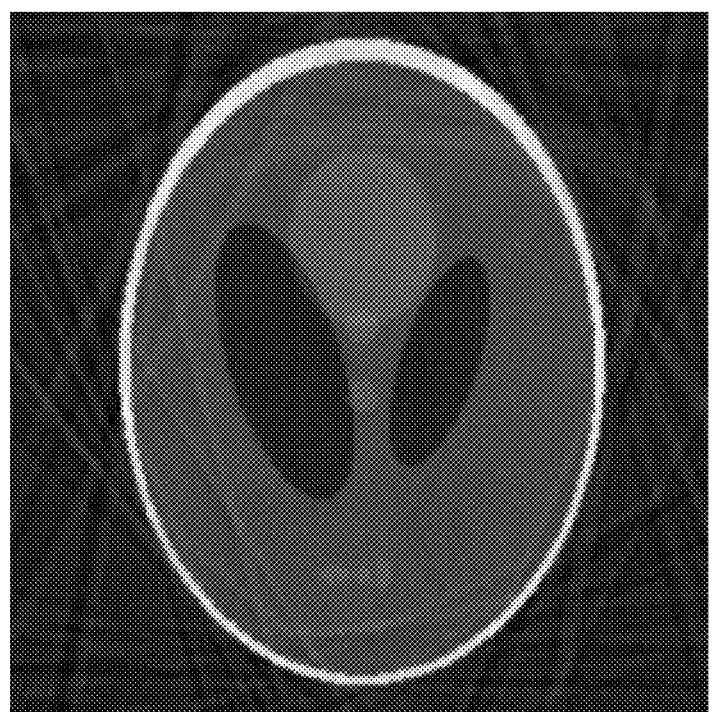
FIG. 4 is an image reconstructed according to the brain projection data of FIG. 3.

In some implementations, image reconstruction is a process of obtaining an image of a cross section of an object, e.g., human body by computer processing according to a group of projection data of the cross section. FIG. 4 is an image obtained by reconstructing according to simulated brain projection data in FIG. 3. As can be seen from FIG. 4, since a part of simulated brain projection data deviates, a plurality of radial artifacts may appear in the reconstructed image of FIG. 4, which may seriously affect an image quality with a poor image contrast.

The present disclosure provides a method for image reconstruction to solve the problem that artifact may appears in a reconstructed image due to movement of projection data, e.g., shift or deviation of the projection data.

Figure 5:
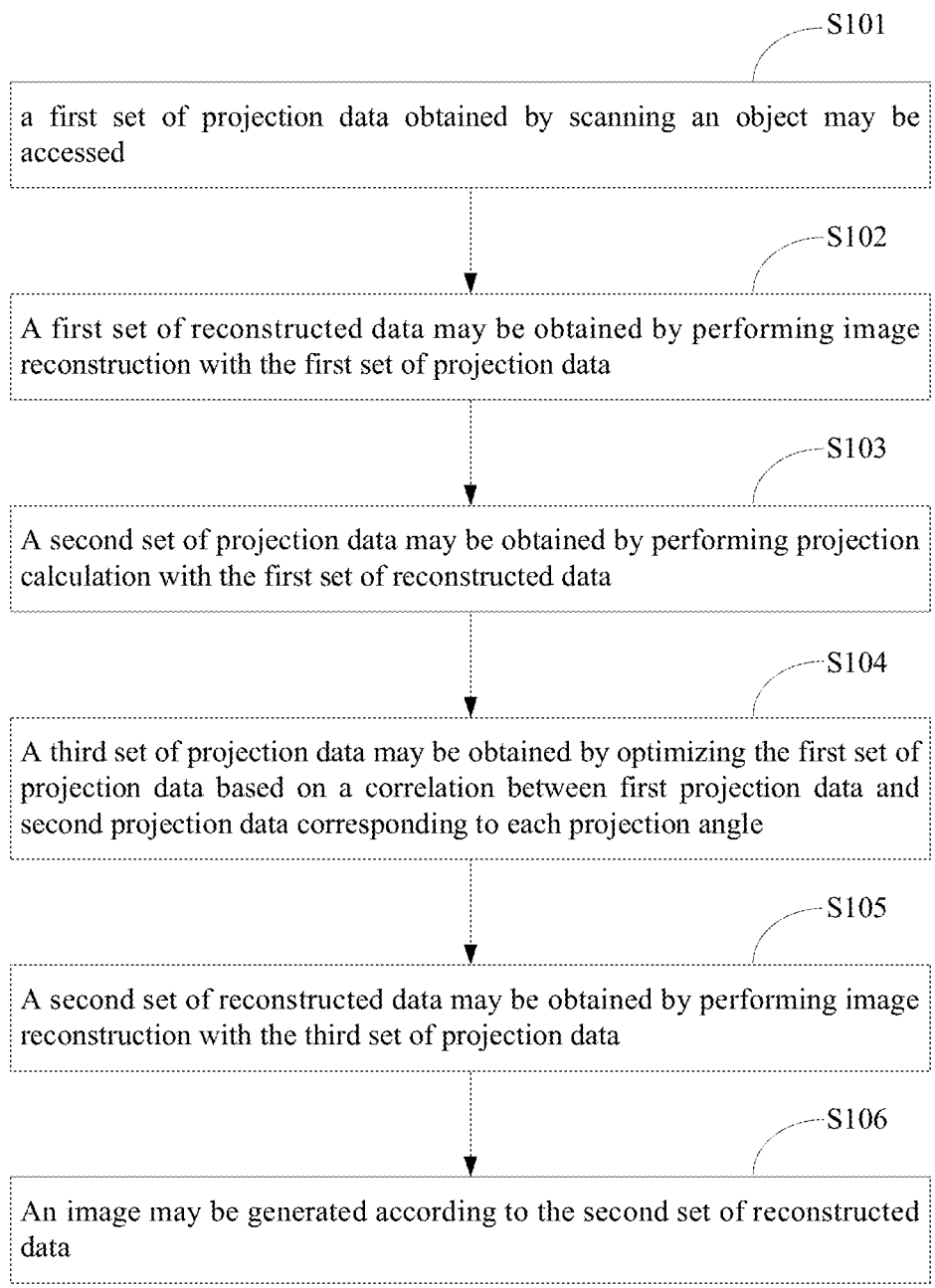
FIG. 5 is a flowchart of an image reconstruction method according to one example of the present disclosure.

FIG. 5 is a flowchart of an image reconstruction method according to one example of the present disclosure. As shown in FIG. 5, the method for image reconstruction provided by this example may include the following blocks S101-S106.

At block S101, a first set of projection data obtained by scanning an object may be accessed. The first set of projection data may include a plurality of first projection data each corresponding to a respective projection angle of a plurality of projection angles. In some cases, for each projection angle of the plurality of projection angles, the first set of projection data includes respective first projection data.

In some practical applications, the projection angle may be preset. For example, each degree of 360 degrees may serve as a projection angle. Alternatively, every other degree may serve as a projection angle, for example, projection data may be acquired at 1 degree or 3 degrees, etc. This is not limited in the present disclosure, and the persons skilled in the art may design themselves according to specific conditions.

At block S102, a first set of reconstructed data may be obtained, e.g., generated, by performing image reconstruction on the first set of projection data with one or more image reconstruction algorithms.

In an example, image reconstruction algorithms may include transform algorithms and series expansion algorithms. Filtered back-projection algorithm, direct back-projection algorithm and direct Fourier transform algorithm are three common algorithms for implementing image reconstruction based on projection. All of the three algorithms belong to transform algorithms. In the following, calculation steps of the filtered back-projection algorithm, of the direct back-projection algorithm, and of the direct Fourier transform algorithm are introduced, respectively.

The calculation steps of the filtered back-projection algorithm may include the following steps. Firstly, supposing that projection data $S_\theta(r)$ is the data corresponding to a projection angle θ in a projection process, where r denotes a coordinate value in a projection coordinate axis. Fourier transform is performed on the projection data $S_\theta(r)$, as follows:

$$F_\theta(R)=FFT(S_\theta(r)) \quad (1).$$

Secondly, the value of each point $F_\theta(R)$ is multiplied by a respective one-dimensional weighting factor W(R) to get a multiple value, which is subjected to an inverse Fourier transform. In this way, corrected projection data $S_\theta'(r)$ are obtained, as follows:

$$S_\theta'(r)=iFFT(F_\theta(R) \bullet W(R)) \quad (2).$$

Thirdly, a direct back-projection calculation may be performed on the corrected projection data $S_\theta'(r)$ to get a back-projection result $b_\theta(x,y)$, with a direct back-projection function as follows:

$$b_\theta(x,y)=\int_{-\infty}^{+\infty} S_\theta'(r)\delta(x \cos \theta + y \sin \theta - r)dr \quad (3),$$

where x represents a row-coordinate of a reconstructed image, y represents a column-coordinate of the reconstructed image, and δ(x cos θ+y sin θ−r) is a Dirac delta function of a projection line with a projection angle of θ and a distance projection from center (namely, an origin of a projection coordinate system) of r.

The foregoing steps can be repeated by changing the projection angle, thus a respective back-projection result of each projection angle θ may be obtained. Final reconstructed data M(x,y) may be obtained by summing the back-projection result $b_\theta(x,y)$ of each projection angle θ:

$$M(x,y)=\Sigma_\theta b_\theta(x,y) \quad (4).$$

The filtered back-projection algorithm can have quick reconstruction speed, high space and density resolution and the like. For the direct back-projection algorithm, after obtaining projection data, a calculation is conducted directly with a back-projection function, and neither Fourier transform nor inverse Fourier transform is performed on the projection data, namely, the projection data are not corrected.

The calculation formula of the direct Fourier transform algorithm may be as below:

$$M(x,y)=\int_{-\infty}^{\infty}\int_{-\infty}^{\infty} F(u,v)e^{j2\pi(ux+vy)}dudv \quad (5),$$

where M(x,y) is reconstructed data, $F_\theta(R)$ is a Cartesian coordinate representation of F(u,v), $F_\theta(R)=FFT(S_\theta(r))$, and $S_\theta(r)$ is the projection data.

In this example, the first set of reconstructed data M(x,y) may be obtained by conducting image reconstruction on the first set of projection data with at least one of the filtered back-projection algorithm, the direct back-projection algorithm, or the direct Fourier transform algorithm. Of course, the above three algorithms do not constitute a limitation on the present disclosure; the skilled person in the art may also perform image reconstruction on the first set of projection data according to other reconstruction algorithms.

At block S103, a second set of projection data may be obtained by performing projection calculation with the first set of reconstructed data.

In this example, a second set of projection data $T_\theta(r)$ may be obtained by performing projection calculation according to the first set of reconstructed data, and a formula for the projection calculation may be as below:

$$T_\theta(r)=\iint M(x,y)\delta(x \cos \theta + y \sin \theta - r)dxdy \quad (6),$$

where, M(x,y) is the first set of reconstructed data, and δ(x cos θ+y sin θ−r) is a Dirac delta function of a projection line with a projection angle of θ and distance from projection center of r.

The second set of projection data may include a plurality of second projection data each corresponding to a respective projection angle of the plurality of projection angles. In some cases, for each projection angle of the plurality of projection angles, the second set of projection data includes respective second projection data. It is to be noted that the projection calculation formula of $T_\theta(r)$ does not constitute a limitation on the present disclosure, and the skilled person in the art may also obtain the second set of projection data according to other formulas on projection of reconstructed data.

At block S104, a third set of projection data may be obtained by optimizing the first set of projection data based on shifting distance between first projection data and second projection data corresponding to each projection angle. For example, for each projection angle, a shifting distance between the respective first projection data and the respective second projection data may be determined, and the first projection data may be corrected with the shifting distance to optimize the first set of projection data and to obtain the third set of projection data.

In an ideal projection condition, if the first projection data do not shift or deviate, the shifting distance between the first projection data and the second projection data obtained according to the first set of reconstructed data may be zero. However, due to electromagnetic interferences and/or other factors, the shifting distance between the first projection data and the second projection data may be not zero. In some cases, the second projection data may be more approximate to the projection data that is not shifted in ideal conditions. In such cases, the shifting distance between the first projection data and the second projection data may be determined, and the first projection data may be corrected according to the shifting distance, so that the first projection data may be approximate or identical to the second projection data, accordingly approximate or identical to the projection data that is not shifted in ideal conditions. In this way, the first projection data may return as close as possible to a position before the deviation, and thereby artifacts in a reconstructed image based on the first set of projection data may be reduced.

Any one of following methods may be employed to determine the shifting distance between the first projection data and the second projection data.

According to one example, for each projection angle, a cross-correlation function for respective first projection data and respective second projection data may be constructed. A shifting distance between the first projection data and the second projection data may be obtained according to a maximum value of the cross-correlation function.

Cross-correlation function may refer to a degree of similarity between two functions on different relative positions. When the cross-correlation function reaches a maximum value, this may indicate that a degree of similarity of the two functions is maximum.

In this example, for a projection angle, a cross-correlation function between first projection data and second projection data can be obtained in two different ways:

1) the first projection data and the second projection data can be converted into first frequency domain data and second frequency domain data, respectively, and then the cross-correlation function is obtained by cross-correlating the first frequency domain data and the second frequency domain data; and 2) the cross-correlation function is obtained by directly cross-correlating the first projection data and the second projection data.

For the first way, the cross-correlation function obtained by converting the first and second projection data into the first and second frequency domain data for cross-correlation may be expressed as below:

$$\text{Corr}_\theta(r) = \text{iFFT}\{\text{FFT}[S_\theta(r)] \cdot \text{conj}[\text{FFT}(T_\theta(r))]\} \quad (7),$$

where $\text{Corr}_\theta(r)$ may indicate a value of a cross-correlation function corresponding to a projection angle θ, $S_\theta(r)$ may indicate first projection data corresponding to the projection angle θ, $T_\theta(r)$ may indicate second projection data corresponding to the projection angle θ, r is the variable parameter, which may indicate a deviation between the first projection data and the second projection data, FFT may indicate a Fourier function, iFFT may indicate an inverse Fourier function, and conj denotes conjugate. For the projection angle θ, a maximum value of the cross-correlation function can be achieved, e.g., by varying a value of the deviation r within a range. When r is equal to a particular value, the value of the cross-correlation function $\text{Corr}_\theta(r)$ may achieve the maximum value.

For the second way, the cross-correlation function obtained by directly cross-correlating the first and second projection data may be expressed as below:

$$\text{Corr}_\theta(r) = \frac{1}{N} \sum_{m=1}^{N} conj(T_\theta(m))S_\theta(r+m), \quad (8)$$

where $\text{Corr}_\theta(r)$ may indicate a value of a cross-correlation function corresponding to a projection angle θ, $S_\theta(m)$ may indicate an $m^{th}$ first projection data corresponding to the projection angle θ, $T_\theta(m)$ may indicate an $m^{th}$ second projection data corresponding to the projection angle θ, r is the variable parameter, which may indicate a shifting distance of the first projection data, conj denotes conjugate, N may indicate a quantity of the first projection data or the second projection data corresponding to the projection angle θ, and m may indicate a serial number of the first projection data and the second projection data. Similarly, the cross-correlation function may achieve a maximum value when r is equal to a particular value.

When a value of the cross-correlation function obtained according to Formula (7) or Formula (8) reaches a maximum value, the deviation r corresponding to the maximum value of the cross-correlation function may be a distance that the first projection data needs to be moved. For example, the first projection data corresponding to positions $r_1$-$r_9$, in a coordinate system, are 0, 0, 0, 10, 15, 12, 18, 25, and 16 respectively, and the second projection data corresponding to positions $r_1$-$r_9$, in the coordinate system, may be 0, 10, 15, 12, 18, 25, 16, 0 and 0 respectively. If the deviation r corresponding to the maximum value of the cross-correlation function obtained by calculation according to Formula (7) or (8) is 7 towards the right, this indicates that the first projection data may need to be deviated towards the right by (9+1)/2-7=-2 positions in the coordinate system in order to correspond to, e.g., be approximate or identical to, the second projection data. That is, the first projection data may be deviated by 2 positions towards the left in the coordinate system as a whole to correspond to the second projection data. The deviated first projection data can serve as projection data corresponding to the projection angle in the third set of projection data. For example, after shifting or being deviated by 2 positions towards the left, first projection data 10 corresponding to the position $r_4$ may be identical to second projection data 10 corresponding to the position $r_2$. Each first projection data corresponding to positions $r_1$-$r_9$ after deviation may be identical to second projection data.

According to another example, the first projection data corresponding to each projection angle may shift or be deviated at a preset step length, a correlation between the shifted or deviated first projection data and the second projection data may be determined for every shifting or deviation, and a distance corresponding to a maximum correlation may be taken as the shifting distance of the first projection data shifting from the second projection data.

In this example, the correlation calculation may be a calculation of correlation coefficient. The correlation coefficient is a statistical indicator that may reflect a level of intimacy of correlation among variables. Taking a Pearson's correlation coefficient as an example, the Pearson's correlation coefficient may describe a degree of linear correlation between two variables. In this example, the correlation coefficient between first projection data and second projection data may be determined with the following formula:

$$\text{Corr}(r) = \tag{9}$$

$$\frac{N\sum_{r=1}^{N}(\text{Shift}(S_\theta(m), r)T_\theta(r)) - \sum_{r=1}^{N}(\text{Shift}(S_\theta(m), r)) * \sum_{r=1}^{N}T_\theta(r)}{\sqrt{N\sum_{r=1}^{N}\left(\text{Shift}(S_\theta(m), r)^2 - \left(\sum_{r=1}^{N}(S_\theta(m), r)\right)\right)^2} * \sqrt{N\sum_{r=1}^{N}(T_\theta(r))^2 - \left(\sum_{r=1}^{N}(T_\theta(r))\right)^2}},$$

where N is a total number of projection lines, and Corr(r) is the correlation coefficient, with its value in the range of [−1, 1] when deviation r varies within a range. If Corr(r) is greater than 0, this indicates that the first projection data are positively correlated with the second projection data; if Corr(r) is smaller than 0, this indicates that the first projection data are negatively correlated with the second projection data; and if Corr(r) is identical to 0, this indicates that the first projection data is not correlated with the second projection data. The greater the absolute value of the Corr(r) is, the stronger the correlation is; and the smaller the absolute value of the Corr(r) is, the weaker the correlation is. In this example, a correlation coefficient corresponding to the shifted (or deviated) first projection data and the second projection data may be determined for every shifting (or deviation). The larger the correlation coefficient is, the higher the correlation is. In this way, a distance shifting from an original position of the first projection data to a shifted position of the first projection data corresponding to a maximum correlation coefficient may be taken as the shifting distance between the first projection data and the second projection data, and the shifted first projection data may be taken as projection data corresponding to the projection angle in the third set of projection data.

For example, supposing that a preset shifted step length is 1, for a 45-degree projection angle, the first projection data may be shifted five times at the preset shifted step length according to a preset shifting or deviation direction, and a correlation coefficient between shifted first projection data, e.g., obtained by calculation, and second projection data for each deviation may be 0.25, 0.16, 0.85, 0.64 and −0.10, respectively. The correlation coefficient when the first projection data is shifted for the third time, e.g., with a shifting length being 3, has the maximum value 0.85. Thus, a shifting distance between the first projection data and the second projection data can be determined to be 3.

In some implementations, the correlation calculation may also be a norm calculation. Norm is a function with a concept of "distance", a nonzero positive length or size endowed by all vectors in vector space. The norm between the shifted first projection data and the second projection data may be determined for every shifting or deviation. The larger the norm is, the larger the distance between the shifted first projection data and the second projection data is, and the weaker the correlation is. The smaller the norm is, the smaller the distance between the shifted first projection data and the second projection data is, and the stronger the correlation is. Therefore, a distance shifting from an original position of the first projection data to a shifted position of the first projection data corresponding to a minimum norm may be taken as the shifting distance between the first projection data and the second projection data, and the shifted first projection data may be taken as projection data corresponding to the projection angle in the third set of projection data.

For example, supposing a preset shifted step length is 1, for a 45-degree projection angle, the first projection data may be shifted five times at the preset shifted step length according to a preset shifting or deviation direction, and a norm between shifted first projection data, e.g., obtained by calculation, and second projection data for each deviation may be 150, 179, 89, 53 and 460, respectively. The norm when the first projection data is shifted for the fourth time, e.g., with a shifting length being 4, has the minimum value 53, thus a shifting distance between the first projection data and the second projection data can be determined to be 4.

In this example, a formula for determining a norm between the shifted first projection data and the second projection data may be as follows:

$$Lp_\theta(r) = \left(\sum_{m=1}^{N}(|\text{Shift}(S_\theta(m), r) - T_\theta(m)|)^p\right)^{1/p} ; \text{ or} \tag{10}$$

alternatively, $$Lp_\theta(r) = \frac{\left(\sum_{m=1}^{N}(|\text{Shift}(S_\theta(m), r) - T_\theta(m)|)^p\right)^{1/p}}{\left(\sum_{m=1}^{N}(|\text{Shift}(S_\theta(m), r)|^p)^{1/p}\right)}, \tag{11}$$

$$\text{Shift}(S_\theta(m), r) = \begin{cases} S_\theta(N+m-r) & m<1 \\ S_\theta(m-r) & 1 \le m \le N, \\ S_\theta(N-m+r) & m>N \end{cases} \tag{12}$$

where $Lp_\theta(r)$ is a norm corresponding to a projection angle θ, p is a number of times of norm vector space, $S_\theta(m)$ is the $m^{th}$ first projection data corresponding to the projection angle θ, $T_\theta(m)$ is the $m^{th}$ second projection data corresponding to the projection angle θ, and N is a quantity of the first projection data or the second projection data corresponding to the projection angle θ.

It should be understood that the above methods for determining the distance shifting from the first projection data corresponding to a projection angle θ to the second projection data do not constitute a limitation on the present disclosure, and the skilled person in the art may also make other methods themselves according to the actual situation.

At block S105, a second set of reconstructed data may be obtained by performing image reconstruction with the third set of projection data.

At block S106, an image may be generated according to the second set of reconstructed data to implement image reconstruction.

In this example, a first set of projection data may be obtained, e.g., by scanning an object, a first set of reconstructed data may be obtained by performing an image reconstruction with the first set of projection data, and a second set of projection data may be obtained by performing a projection calculation with the first set of reconstructed data. If first projection data corresponding to a certain projection angle in the first set of projection data is not shifted, the first projection data corresponding to the projection angle may be consistent with second projection data theoretically, namely, the shifting distance between the first projection data and the second projection data may be zero. If first projection data corresponding to a certain projection angle in the first set of projection data is shifted, a difference may exist between the first projection data corresponding to the projection angle and the second projection data. Since the second projection data that is more approximate to first projection data not shifted in ideal conditions, the first projection data may be corrected by determining a distance shifting from the first projection data to the second projection data so that the first projection data may be approximate to or overlap with the second projection data. In this way, optimization of the first set of projection data may be implemented to obtain a third set of projection data. A second set of reconstructed data may be obtained by performing image reconstruction with the optimized first set of projection data, that is, the third set of projection data. In an image generated with the second set of reconstructed data, artifacts may be reduced effectively.

It should be noted that when shifted first projection data exist in the first set of projection data, corresponding second projection data in the second set of projection data may merely approximate to, instead of being completely consistent with, first projection data not shifted in ideal conditions. This is because the second set of projection data may be obtained by projection according to the first set of reconstructed data, whereas the first set of reconstructed data may be obtained by performing an image reconstruction according to the first projection data, and the second set of projection data may likely be affected by the shifted first projection data.

Figure 6:
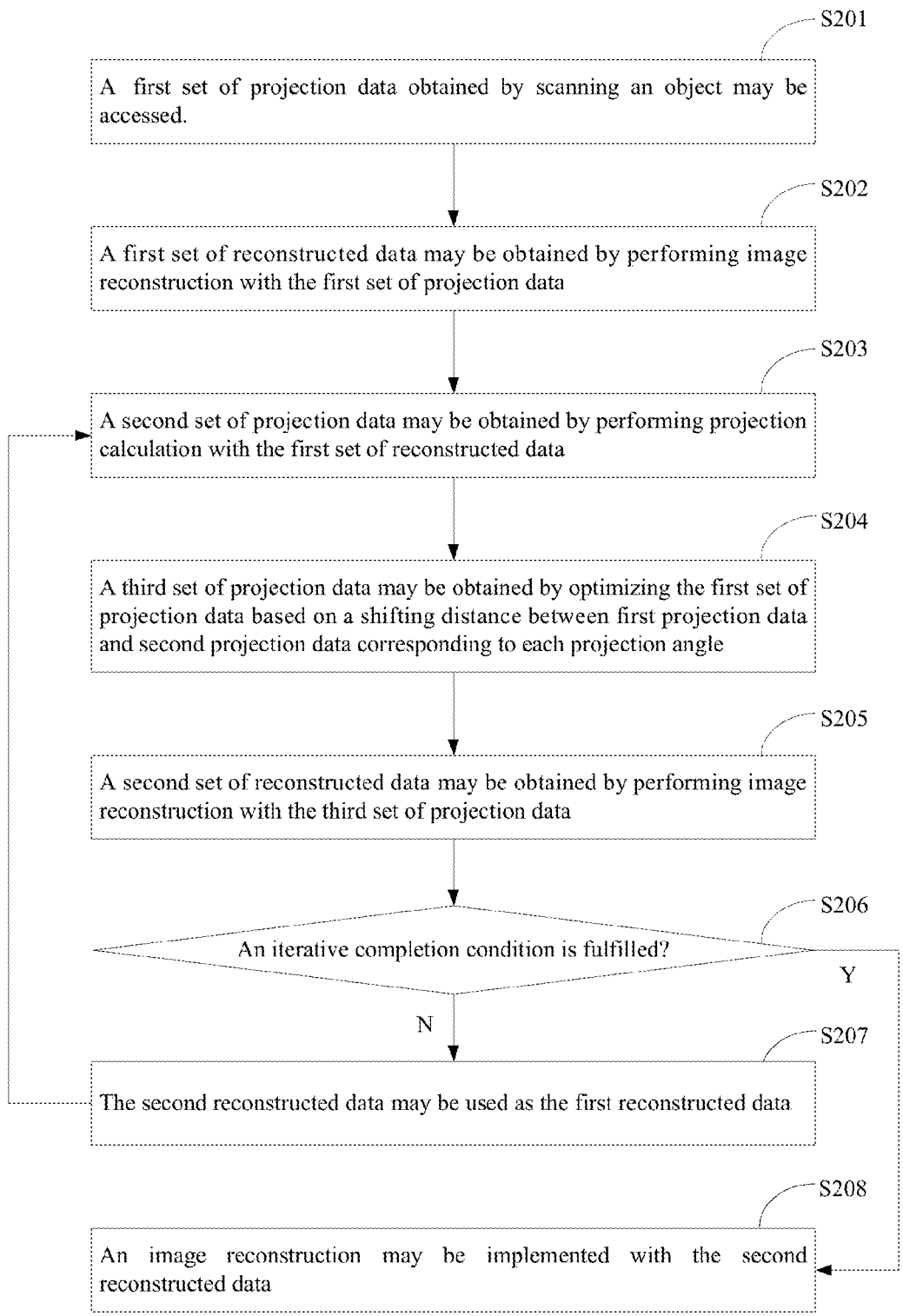
FIG. 6 is a flowchart of an image reconstruction method according to another example of the present disclosure.

FIG. 6 is a flowchart of an image reconstruction method according to another example of the present disclosure. As shown in FIG. 6, the method for image reconstruction provided by this example may include the following blocks S201-S208.

At block S201, a first set of projection data may be obtained by scanning an object. The first set of projection data may include a plurality of first projection data each corresponding to a respective projection angle of a plurality of projection angles. In some cases, for each projection angle, the first set of projection data includes a respective first projection data.

At block S202, a first set of reconstructed data may be obtained by performing image reconstruction with the first set of projection data.

At block S203, a second set of projection data may be obtained by performing projection calculation with the first set of reconstructed data. The second set of projection data may include a plurality of second projection data each corresponding to a respective projection angle of the plurality of projection angles. In some cases, for each projection angle, the second set of projection data includes a respective second projection data.

At block S204, a third set of projection data may be obtained by optimizing the first set of projection data based on a shifting distance between the first projection data and the second projection data corresponding to each projection angle. For example, a distance of the first projection data corresponding to each projection angle shifting to the second projection data may be determined, the first projection data may be corrected with the shifting distance to implement optimization of the first set of projection data.

At block S205, a second set of reconstructed data may be obtained by performing image reconstruction with the third set of projection data.

At block S206, it is determined whether an iterative completion condition is fulfilled, block S207 may be executed if the iterative completion condition is not fulfilled, otherwise, block S208 may be executed. As discussed in further details below, the iterative completion condition can include at least one of: a number of iterations reaching a preset value or a difference between a second set of reconstructed data obtained in a previous iteration and a second set of reconstructed data obtained in a current iteration being less than or equal to a preset threshold.

At block S207, the second set of reconstructed data obtained at block S205 may be used as the first set of reconstructed data at block S203, and return to block S203 to continue executing a next iteration.

At block S208, an image reconstruction may be implemented by generating an image using the second set of reconstructed data.

Projection, correction and reconstruction may be carried out repeatedly by adding the step of iteration so that the second projection data may further approximate to a position on which the first projection data are not shifted theoretically, thus more radial artifacts may be reduced and a better image quality may be obtained. Specifically, after obtaining the second set of reconstructed data, it is determined whether to use the second set of reconstructed data to generate an image according to whether a predetermined iteration condition is fulfilled.

For example, if the predetermined iteration condition is not fulfilled, this indicates that the second set of reconstructed data may be further optimized. Thereby, the second set of reconstructed data may be used as a new first set of reconstructed data, and the method returns to block S203 to carry out a projection calculation with the new first set of reconstructed data. In this way, a new second set of projection data may be obtained. In such a case, the second set of projection data may include second projection data corresponding to each projection angle. It should be noted that in this iteration, the new second set of projection data may be obtained by performing a projection calculation according to the new first set of reconstructed data (namely, the second set of reconstructed data obtained in a previous iteration), which may be different from the second set of projection data obtained by performing a projection calculation according to the original first set of reconstructed data in the previous iteration process. Afterwards, the distance of the first projection data corresponding to each projection angle shifting from the second projection data may be determined, namely, block S204 may be executed again. The first projection data may be original projection data obtained by projecting an object. The first projection data may be corrected with the shifting distance to implement a re-optimization of the first set of projection data, namely to obtain a new third set of projection data. Finally, a new second set of reconstructed data may be obtained by performing image reconstruction with the new third set of projection data.

After obtaining a second set of reconstructed data in each iteration, it may be determined whether the iterative completion condition is fulfilled. Iteration may be stopped if the iterative completion condition is fulfilled, and an image may be generated with the second set of reconstructed data obtained upon completion of the iteration. If the iterative completion condition is not fulfilled, iteration may be continued until the iteration condition is fulfilled. As the number of iterations increases, radial artifacts in an obtained image may be less and less, and the image quality may be better and better.

In some examples, the iteration condition may reach a preset number of iterations. Alternatively, the iteration condition may be a difference between the second set of reconstructed data generated in this iteration and reconstructed data before optimization (namely, the second set of reconstructed data generated in the previous iteration) being less than or equal to a preset limit value or threshold, as follows:

$$\varepsilon \geq \frac{\sqrt{\sum_{x,y}(|M^i(x,y)-M^{i-1}(x,y)|)^2}}{\sqrt{\sum_{x,y}(|M^i(x,y)|)^2}}, \quad (13)$$

where $M^i(x,y)$ is a second set of reconstructed data obtained in an $i^{th}$ iteration, and $M^{i-1}(x,y)$ is a second set of reconstructed data obtained in an $(i-1)^{th}$ iteration. In other words, an iteration may be stopped if the difference between a reconstructed image obtained in the $i^{th}$ iteration and a reconstructed image obtained in the $(i-1)^{th}$ iteration is small enough. Of course, the two conditions do not constitute limitation on the present disclosure, and the skilled person in the art may also make a design according to actual demands.

In this example, streak artifacts in the reconstructed image may be further reduced by loop iterations so that the quality of the reconstructed image may be improved effectively.

Figure 7:
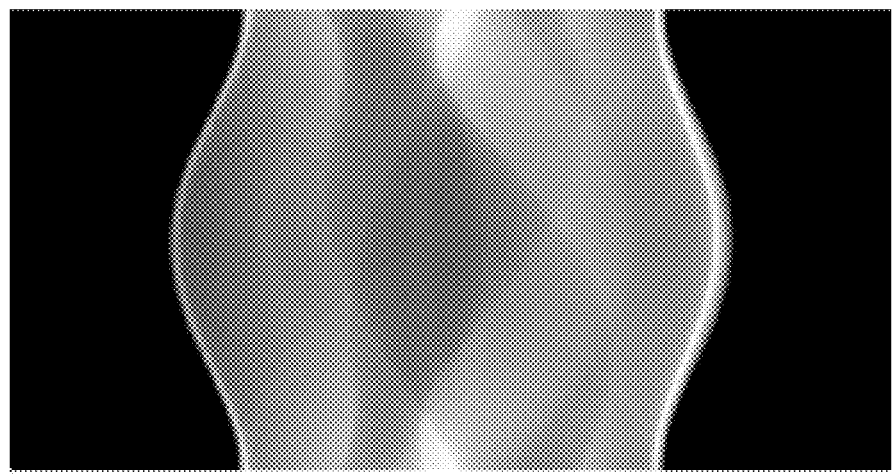
FIG. 7 is a projection diagram corresponding to the brain projection data of FIG. 3 according to one example of the present disclosure.
Figure 8:
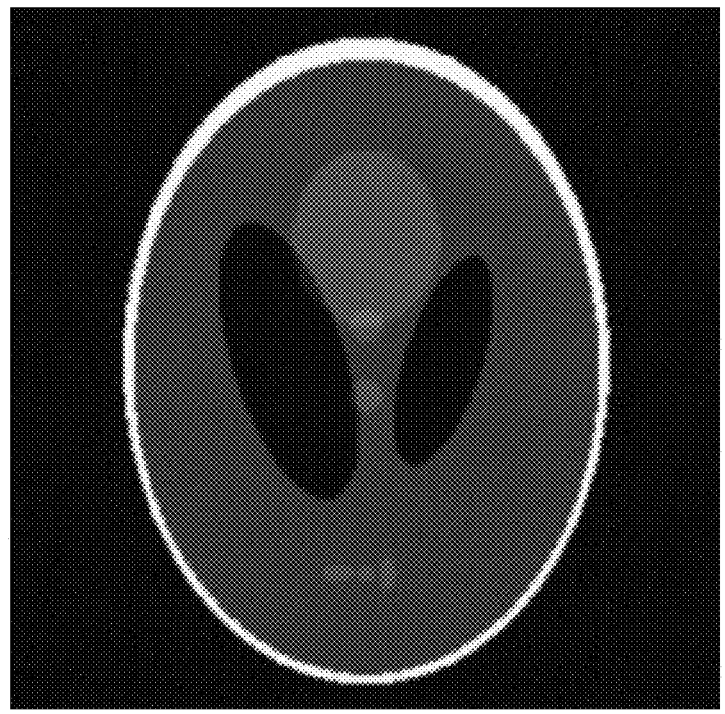
FIG. 8 is an image obtained by performing image reconstruction according to brain projection data provided by one example of the present disclosure.

FIG. 7 is a projection diagram obtained by correcting brain projection data. Compared with FIG. 3, image lines in the projection diagram of FIG. 7 appear smoother. FIG. 8 is an image obtained by performing image reconstruction based on the corrected projection data. Compared with FIG. 4, in FIG. 8, artifact may be less, a contrast may be higher, and thus the image quality may be effectively improved.

Based on the image reconstruction method according to the above examples, the present disclosure further provides an apparatus for image reconstruction, and the working principle thereof is described in detail with reference to the accompanying drawings in the following.

Figure 9:
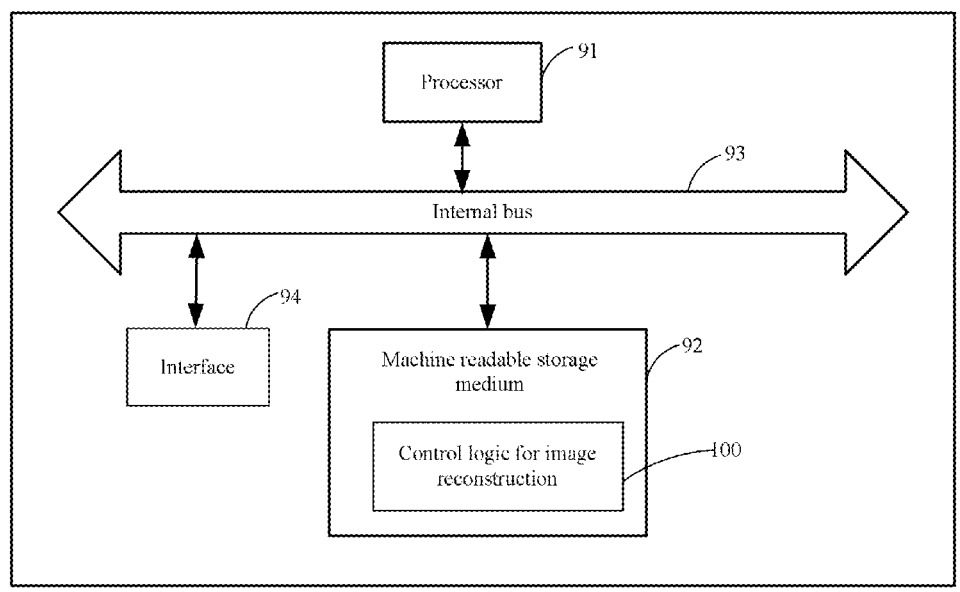
FIG. 9 is a hardware architecture diagram of an apparatus for image reconstruction according to one example of the present disclosure.

Referring to FIG. 9, the apparatus may include a processor 91 and a machine-readable storage medium 92, which may be applied to a device of a projection system or any electronic device having a processor (particularly an image processor). The electronic device may include but not limited to: existing, being developed or to-be-developed desktop computers, laptop computers and mobile terminals (including smart mobile phones, non-smart phones, and various tablet computers), etc. The processor 91 and the machine-readable storage medium 92 generally may be interconnected via an internal bus 93. In other possible implementations, the apparatus may further include an interface 94 to enable to communicate with other devices or parts.

In different examples, the machine-readable storage medium 92 may be a random access memory (RAM), a volatile memory, a nonvolatile memory, a flash memory, a memory drive (such as a hard disk drive), a solid state drive, any type of memory disks (such as an optical disk or a DVD and so on), or a similar storage medium or a combination thereof.

Figure 10:
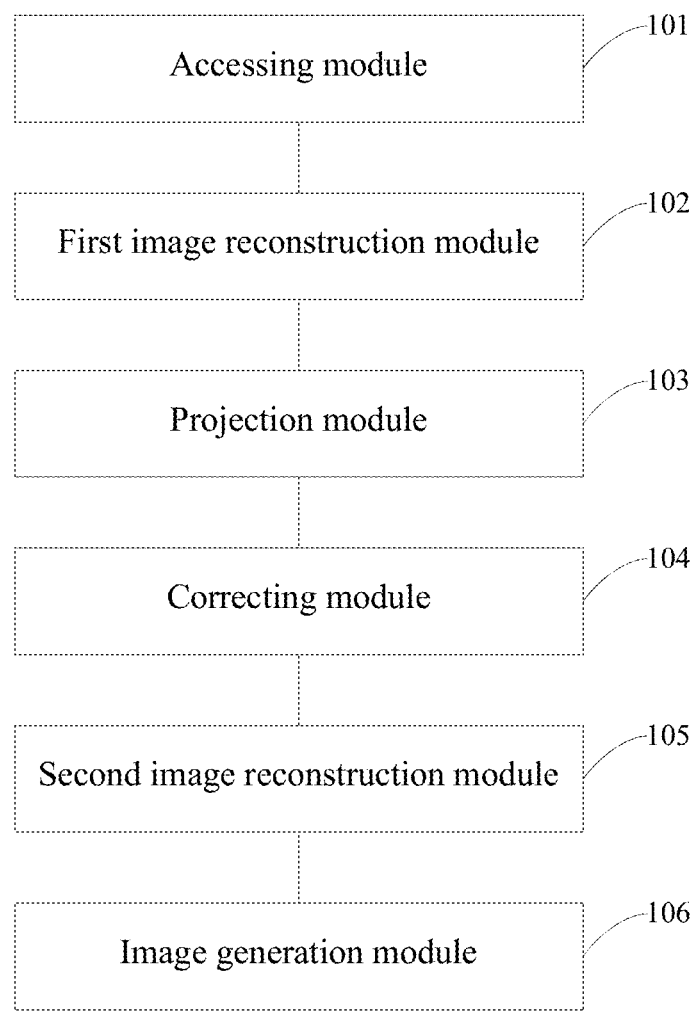
FIG. 10 is a functional module diagram of a control logic for image reconstruction according to one example of the present disclosure.
Figure 11:
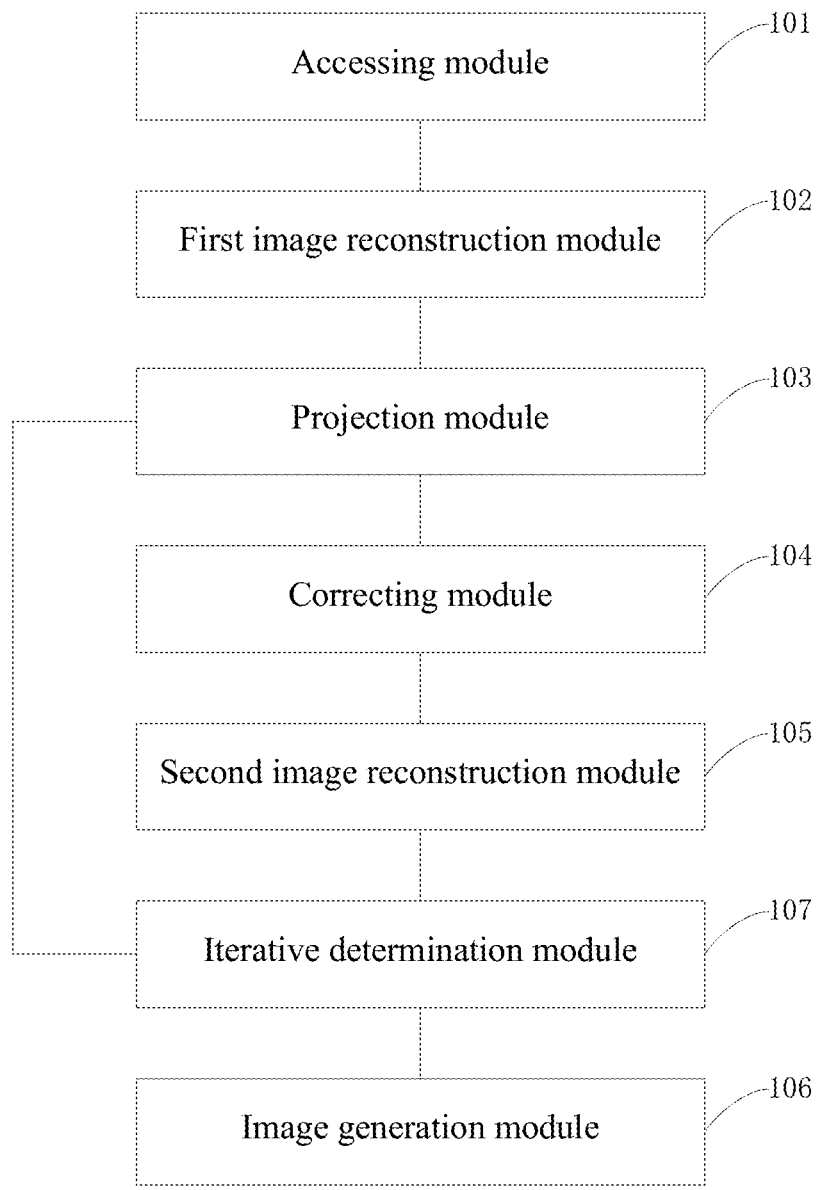
FIG. 11 is a functional module diagram of a control logic for image reconstruction according to another example of the present disclosure.

Further, the machine-readable storage medium 92 may store machine-executable instructions corresponding to control logic for image reconstruction 100. Functionally divided, as shown in FIG. 10, the control logic for image reconstruction may include an accessing module 101, a first image reconstruction module 102, a projection module 103, a correcting module 104, a second image reconstruction module 105 and an image generation module 106.

The accessing module 101 may be connected to the first image reconstruction module 102, the first image reconstruction module 102 may be connected to the projection module 103, the projection module 103 may be connected to the correcting module 104, the correcting module 104 may be connected to the second image reconstruction module 105, and the second image reconstruction module 105 may be connected to the image generation module 106.

The accessing module 101 may be configured to access a first set of projection data obtained by scanning an object. The first set of projection data may include first projection data corresponding to each projection angle.

The first image reconstruction module 102 may be configured to perform image reconstruction with the first set of projection data to obtain first set of reconstructed data.

The projection module 103 may be configured to perform projection calculation according to the first set of reconstructed data to obtain a second set of projection data. The second set of projection data may include second projection data respectively corresponding to each projection angle.

The correcting module 104 may be configured to optimize the first set of projection data based on a shifting distance between the first projection data and the second projection data corresponding to each projection angle. For example, a distance of the first projection data corresponding to each projection angle shifting to the second projection data may be determined, and the first projection data may be corrected with the shifting distance to implement optimization of the first set of projection data. In this way, a third set of projection data may be obtained.

In a possible implementation manner, the correcting module 104 may be specifically configured to construct a cross-correlation function regarding to the corresponding first projection data and the second projection data corresponding to each projection angle, obtain the shifting distance between the first projection data and the second projection data corresponding to the projection angle according to a maximum value of the cross-correlation function, and obtain projection data corresponding to the projection angle in the third set of projection data by shifting the first projection data corresponding to the projection angle with the shifting distance.

In another possible implementation manner, the correcting module 104 may be specifically configured to shift the first projection data a plurality of times at a preset step length corresponding to each projection angle, determine a correlation between the shifted first projection data and the second projection data for every deviation, take a shifting length corresponding to a maximum correlation as the shifting distance between the first projection data and the second projection data corresponding to the projection angle, and obtain projection data corresponding to the projection angle in the third set of projection data by shifting the first projection data corresponding to the projection angle with the shifting distance. The shifting length is a particular number of times of the preset step length, and the particular number is no more than a number of the plurality of times.

The above two possible implementations do not constitute a limitation on the present disclosure, and the skilled person in the art may also design by themselves according to the actual condition.

The second image reconstruction module 105 may be configured to perform image reconstruction with the third set of projection data to obtain a second set of reconstructed data.

The image generation module 106 may be configured to generate an image according to the second set of reconstructed data to implement image reconstruction.

In this example, image reconstruction may be performed with the first set of projection data obtained by scanning an object to obtain first set of reconstructed data. Afterwards, projection calculation may be performed on the first set of reconstructed data to obtain a second set of projection data. Then, a distance of the corresponding first projection data shifting from the second projection data may be determined corresponding to each projection angle, and the first projection data may be corrected with the shifting distance to implement an optimization of the first set of projection data, thereby obtaining a third set of projection data. A second set of reconstructed data may be obtained by performing image reconstruction according to the third set of projection data. Compared with an image obtained by performing image reconstruction using the first set of projection data, in an image generated with the second set of reconstructed data, radial artifacts may be effectively reduced, thereby improving the image quality.

Further, referring to FIG. 10, functionally divided, the control logic 100 may further include an iterative determination module 107. The iterative determination module 107 may be connected to the second image reconstruction module 105 and the projection module 103 respectively, and used to determine whether an iterative completion condition is fulfilled. If a determination result of the iterative determination module 107 is negative, that is, the interactive completion condition is not fulfilled, the second set of reconstructed data may be sent as a new first set of reconstructed data to the projection module 103 for iteration, and the projection module 103 may be activated to generate a new second set of projection data. If a determination result of the iterative determination module 107 is positive, that is, the interactive completion condition is fulfilled, the image generation module 106 may be activated. The iterative completion condition may include: a number of iterations reaching a preset value, or a difference between a second set of reconstructed data obtained in a previous interaction and a second set of reconstructed data obtained in current iteration being less than or equal to a preset threshold.

In such a case, the projection module 103 may be further configured to perform projection calculation according to the new first set of reconstructed data to obtain a new second set of projection data. The image generation module 106 may be configured specifically to generate an image according to the second set of reconstructed data obtained after completion of the iteration, so as to implement image reconstruction.

In this example, the quality of the reconstructed image may be further improved by looping iteration.

When the function of the logic instructions corresponding to the image reconstruction method is implemented in the form of a software functional unit and is sold or used as an independent product, the instructions may be stored in a computer-readable storage medium. Based on such understanding, the technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of blocks of the method as recited in the examples of the present disclosure. The aforementioned storage medium may include: a USB flash disk, a mobile hard disk, a read-only memory (ROM), a random access memory (RAM), a magnetic disk or an optical disk and other media capable of storing a program code.

When the function of the logic instructions corresponding to the method for image reconstruction is implemented in the form of a software functional unit and is sold or used as an independent product, the instructions may be stored in a computer-readable storage medium. Based on such understanding, the technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of blocks of the method as recited in the examples of the present disclosure. The aforementioned storage medium may include: a USB flash disk, a mobile hard disk, a read-only memory (ROM), a random access memory (RAM), a magnetic disk or an optical disk and other medium capable of storing a program code.

Taking software implementation as an example, the following further describes how to execute the control logic 100 by the image reconstruction apparatus. In this example, the control logic 100 in the present disclosure may be interpreted as machine-executable instructions stored in the machine-readable storage medium 92. When the processor 91 on the image reconstruction apparatus of the present disclosure executes the machine-executable instructions corresponding to the control logic 100, by invoking the machine-executable instructions stored on the machine-readable storage medium 92, the processor 91 may be caused to:

access a first set of projection data obtained by scanning an object, wherein the first set of projection data comprises first projection data corresponding to each projection angle;

obtain a first set of reconstructed data by performing image reconstruction with the first set of projection data;

obtain a second set of projection data by performing projection calculation according to the first set of reconstructed data, wherein the second set of projection data comprises second projection data corresponding to each projection angle;

obtain a third set of projection data by correcting the first projection data based on shifting distance between the first projection data and the second projection data corresponding to the projection angle; and obtain a second set of projection data by performing image reconstruction with the third set of projection data.

According to one example, when obtain a third set of projection data by correcting the first projection data based on a shifting distance between the first projection data and the second projection data corresponding to the projection angle to obtain a third set of projection data, the machine-executable instructions may cause the processor 91 to:

determine a cross-correlation function regarding to the corresponding first projection data and the second projection data corresponding to a projection angle;

obtain the shifting distance between the first projection data and the second projection data corresponding to the projection angle according to a maximum value of the cross-correlation function; and obtain projection data corresponding to the projection angle in the third set of projection data by shifting the first projection data corresponding to the projection angle with the shifting distance.

A formula for determining the cross-correlation function may be:

$$\mathrm{Corr}_\theta(r) = \mathrm{iFFT}\{\mathrm{FFT}[S_\theta(r)] \cdot \mathrm{conj}[\mathrm{FFT}(T_\theta(r))]\}.$$

Where $\mathrm{Corr}_\theta(r)$ may indicate a value of the cross-correlation function corresponding to a projection angle $\theta$, $S_\theta(r)$ may indicate the first projection data corresponding to the projection angle θ, $T_\theta(r)$ may indicate the second projection data corresponding to the projection angle θ, r may indicate a deviation of the first projection data, FFT may indicate a Fourier function, iFFT may indicate an inverse Fourier function, and conj denotes conjugate.

Alternatively, a formula for determining the cross-correlation function may be:

$$\text{Corr}_\theta(r) = \frac{1}{N} \sum_{m=1}^{N} conj(T_\theta(m)) S_\theta(r+m).$$

where $\text{Corr}_\theta(r)$ may indicate a value of the cross-correlation function corresponding to a projection angle θ, $S_\theta(m)$ may indicate $m^{th}$ first projection data corresponding to the projection angle θ, $T_\theta(m)$ may indicate $m^{th}$ second projection data corresponding to the projection angle θ, conj denotes conjugate, N may indicate a quantity of the first projection data or the second projection data corresponding to the projection angle θ, m may indicate a serial number of the first projection data and second projection data, and r may indicate a deviation of the first projection data.

According to one example, when correcting the first projection data based on a shifting distance between the first projection data and the second projection data corresponding to the projection angle to obtain a third set of projection data, the machine-executable instructions may cause the processor 91 to:

shift the first projection data corresponding to a projection angle a plurality times at a preset step length, take a shifting length corresponding to a maximum correlation between the shifted first projection data and the second projection data as the shifting distance between the first projection data and the second projection data corresponding to the projection angle, the shifting length being a particular number of times of the preset step length, the particular number being no more than a number of the plurality of times; and obtain projection data corresponding to the projection angle in the third set of projection data by shifting the first projection data corresponding to the projection angle with the shifting distance.

When taking a shifting length corresponding to a maximum correlation between the shifted first projection data and the second projection data as the shifting distance between the first projection data and the second projection data corresponding to the projection angle, the machine-executable instructions may cause the processor 91 to:

determine a correlation coefficient corresponding to the shifted first projection data and the second projection data for every shifting or deviation; and take a distance shifting from the first projection data corresponding to a maximum correlation coefficient to an original position as the shifting distance between the first projection data and the second projection data corresponding to the projection angle, the distance being the shifting length.

Alternatively, when taking a shifting length corresponding to a maximum correlation between the shifted first projection data and the second projection data as the shifting distance between the first projection data and the second projection data corresponding to the projection angle, the machine-executable instructions may cause the processor 91 to:

determine a norm corresponding to the shifted first projection data and the second projection data for every deviation, and take a distance shifting from the first projection data corresponding to a minimum norm to an original position as the shifting distance between the first projection data and the second projection data corresponding to the projection angle, the distance being the shifting length.

According to one example, the machine-executable instructions may further cause the processor to generate a reconstructed image according to the second set of reconstructed data.

According to another example, the machine-executable instructions may further cause the processor to:

determine whether a preset iterative completion condition is fulfilled;

if the iterative completion condition is not fulfilled, take the second set of reconstructed data as new first set of reconstructed data, and performing projection calculation again according to the new first set of reconstructed data to implement an iteration; or if the iterative completion condition is fulfilled, generate a reconstructed image according to the second set of reconstructed data.

The iterative completion condition may include any one or more of following conditions: a number of iterations reaching a preset value, or the difference between the second set of reconstructed data obtained previous time and second set of reconstructed data obtained in current iteration being less than or equal to a preset threshold.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on. The term "shift" and its variations such as "shifting" or "shifted", may be used interchangeably with the term "deviate" and its variations such as "deviating" or "deviation", or "deviated", respectively.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Accordingly, other embodiments are within the scope of the following claims.

The invention claimed is:

1. A method of reconstructing image, comprising:
   accessing a first set of projection data that comprises a plurality of first projection data each corresponding to a respective projection angle of a plurality of projection angles;
   generating a first set of reconstructed data by image reconstruction with the first set of projection data;
   generating a second set of projection data by projection calculation according to the first set of reconstructed data, wherein the second set of projection data comprises a plurality of second projection data each corresponding to a respective projection angle of the plurality of projection angles;
   generating a third set of projection data by correcting the first projection data based on a shifting distance between the first projection data and the second projection data corresponding to each of the plurality of projection angles; and
   generating a second set of reconstructed data by image reconstruction with the third set of projection data.

2. The method according to claim 1, wherein generating the third set of projection data comprises:
   constructing, for a projection angle, a cross-correlation function for first projection data and second projection data corresponding to the projection angle;
   determining the shifting distance between the first projection data and second projection data corresponding to the projection angle according to a maximum value of the cross-correlation function; and
   obtaining projection data corresponding to the projection angle in the third set of projection data by shifting the first projection data corresponding to the projection angle with the shifting distance.

3. The method according to claim 2, wherein the cross-correlation function is:

$$\mathrm{Corr}_\theta(r) = \mathrm{iFFT}\{\mathrm{FFT}[S_\theta(r)] \cdot \mathrm{conj}[\mathrm{FFT}(T_\theta(r))]\},$$

wherein $\mathrm{Corr}_\theta(r)$ indicates a value of the cross-correlation function corresponding to a projection angle $\theta$,
   $S_\theta(r)$ indicates the first projection data corresponding to the projection angle $\theta$,
   $T_\theta(r)$ indicates the second projection data corresponding to the projection angle $\theta$,
   r indicates a deviation of the first projection data,
   FFT indicates a Fourier function,
   iFFT indicates an inverse Fourier function, and
   conj denotes conjugate.

4. The method according to claim 2, wherein the cross-correlation function is:

$$\mathrm{Corr}_\theta(r) = \frac{1}{N}\sum_{m=1}^{N} conj(T_\theta(m))S_\theta(r+m),$$

wherein $\mathrm{Corr}_\theta(r)$ indicates a value of the cross-correlation function corresponding to a projection angle $\theta$,
   $S_\theta(m)$ indicates the $m^{th}$ first projection data corresponding to the projection angle $\theta$,
   $T_\theta(m)$ indicates the $m^{th}$ second projection data corresponding to the projection angle $\theta$,
   conj denotes conjugate,
   N indicates a quantity of the first projection data or the second projection data corresponding to the projection angle $\theta$,
   m indicates a serial number of the first projection data and the second projection data, and
   r indicates a deviation of the first projection data.

5. The method according to claim 1, wherein generating the third set of projection data comprises:
   shifting the first projection data corresponding to a projection angle a plurality of times at a preset step length;
   taking a shifting length corresponding to a maximum correlation between the shifted first projection data and the second projection data as the shifting distance between the first projection data and the second projection data corresponding to the projection angle, the shifting length being a particular number of times of the preset step length, the particular number being no more than a number of the plurality of times; and
   obtaining projection data corresponding to the projection angle in the third set of projection data by shifting the first projection data corresponding to the projection angle with the shifting distance.

6. The method according to claim 5, wherein taking a shifting length corresponding to a maximum correlation between the shifted first projection data and the second projection data as the shifting distance between the first projection data and the second projection data corresponding to the projection angle comprises:
   determining, for each shifting, a correlation coefficient between a respective shifted first projection data and the second projection data corresponding to the projection angle; and taking a distance shifting from the first projection data corresponding to a maximum correlation coefficient as the shifting distance between the first projection data and the second projection data corresponding to the projection angle, the distance being the shifting length.

7. The method according to claim 5, wherein taking a shifting length corresponding to a maximum correlation between the shifted first projection data and the second projection data as the shifting distance between the first projection data and the second projection data corresponding to the projection angle comprises:

determining, for each shifting, a norm between a respective shifted first projection data and the second projection data corresponding to the projection angle, and taking a distance shifting from the first projection data corresponding to a minimum norm as the shifting distance between the first projection data and the second projection data corresponding to the projection angle, the distance being the shifting length.

8. The method according to claim 1, further comprising: generating a reconstructed image according to the second set of reconstructed data.

9. The method according to claim 1, further comprising: determining whether an iterative completion condition is fulfilled;

if the iterative completion condition is not fulfilled, taking the second set of reconstructed data as a new first set of reconstructed data, and generating a new second set of reconstructed data based on the new first set of reconstructed data; and if the iterative completion condition is fulfilled, generating a reconstructed image according to the second set of reconstructed data.

10. The method according to claim 9, wherein the iterative completion condition comprises at least one of:

a number of iterations reaching a preset value, or a difference between a second set of reconstructed data obtained in a previous iteration and a second set of reconstructed data obtained in a current iteration being no more than a preset threshold.

11. An apparatus for image reconstruction, comprising:
a processor; and
a machine readable storage medium storing machine-executable instructions that correspond to a control logic for image reconstruction and upon such execution cause the processor to:

access a first set of projection data that comprises a plurality of first projection data each corresponding to a respective projection angle of a plurality of projection angles;

generate a first set of reconstructed data by image reconstruction with the first set of projection data;

generate a second set of projection data by projection calculation according to the first set of reconstructed data, wherein the second set of projection data comprises a plurality of second projection data each corresponding to a respective projection angle of the plurality of projection angles;

generate a third set of projection data by correcting the first projection data based on a shifting distance between the first projection data and the second projection data corresponding to each of the plurality of projection angles; and generate a second set of reconstructed data by image reconstruction with the third set of projection data.

12. The apparatus according to claim 11, wherein the machine-executable instructions cause the processor to generate the third set of projection data by:

constructing, for a projection angle, a cross-correlation function for first projection data and second projection data corresponding to the projection angle;

determining the shifting distance between the first projection data and the second projection data corresponding to the projection angle according to a maximum value of the cross-correlation function; and obtaining projection data corresponding to the projection angle in the third set of projection data by shifting the first projection data corresponding to the projection angle with the shifting distance.

13. The apparatus according to claim 12, wherein the cross-correlation function is:

$$\mathrm{Corr}_\theta(r) = \mathrm{iFFT}\{\mathrm{FFT}[S_\theta(r)] \cdot \mathrm{conj}[\mathrm{FFT}(T_\theta(r))]\},$$

wherein $\mathrm{Corr}_\theta(r)$ indicates a value of the cross-correlation function corresponding to a projection angle $\theta$, $S_\theta(r)$ indicates the first projection data corresponding to the projection angle $\theta$, $T_\theta(r)$ indicates the second projection data corresponding to the projection angle $\theta$, r indicates a deviation of the first projection data, FFT indicates a Fourier function, iFFT indicates an inverse Fourier function, and conj denotes conjugate.

14. The apparatus according to claim 12, wherein the cross-correlation function is:

$$\mathrm{Corr}_\theta(r) = \frac{1}{N}\sum_{m=1}^{N} conj(T_\theta(m))S_\theta(r+m),$$

wherein $\mathrm{Corr}_\theta(r)$ indicates a value of the cross-correlation function corresponding to a projection angle $\theta$, $S_\theta(m)$ indicates $m^{th}$ first projection data corresponding to the projection angle $\theta$, $T_\theta(m)$ indicates $m^{th}$ second projection data corresponding to the projection angle $\theta$, conj denotes conjugate, N indicates a quantity of the first projection data or the second projection data corresponding to the projection angle $\theta$, m indicates a serial number of the first projection data and second projection data, and r indicates a deviation of the first projection data.

15. The apparatus according to claim 11, wherein the machine-executable instructions cause the processor to generate the third set of projection data by:

shifting, for a projection angle, corresponding first projection data a plurality of times at a preset step length, taking a shifting length corresponding to a maximum correlation between the shifted first projection data and the second projection data as the shifting distance between the first projection data and the second projection data corresponding to the projection angle, the shifting length being a particular number of times of the preset step length, the particular number being no more than a number of the plurality of times; and obtaining projection data corresponding to the projection angle in the third set of projection data by shifting the first projection data corresponding to the projection angle with the shifting distance.

16. The apparatus according to claim 15, wherein the machine-executable instructions cause the processor to take a shifting length corresponding to a maximum correlation between the shifted first projection data and the second projection data as the shifting distance between the first projection data and the second projection data by:

- determining, for each shifting, a correlation coefficient corresponding to the shifted first projection data and the second projection data; and
- taking a distance shifting from the first projection data corresponding to a maximum correlation coefficient as the shifting distance between the first projection data and the second projection data corresponding to the projection angle, the distance being the shifting length.

17. The apparatus according to claim 15, wherein the machine-executable instructions cause the processor to take a shifting distance corresponding to a maximum correlation between the shifted first projection data and the second projection data as the shifting distance between the first projection data and the second projection data corresponding to the projection angle by:

- determining, for each shifting, a norm corresponding to the shifted first projection data and the second projection data; and
- taking a distance shifting from the first projection data corresponding to a minimum norm as the shifting distance between the first projection data and the second projection data corresponding to the projection angle, the distance being the shifting length.

18. The apparatus according to claim 11, wherein the machine-executable instructions further cause the processor to:

generate a reconstructed image according to the second set of reconstructed data.

19. The apparatus according to claim 11, wherein the machine-executable instructions further cause the processor to:

- determine whether an iterative completion condition is fulfilled;
- if the iterative completion condition is not fulfilled, take the second set of reconstructed data as a new first set of reconstructed data, and generate a new second set of reconstructed data based on the new first set of reconstructed data; and
- if the iterative completion condition is fulfilled, generate a reconstructed image according to the second set of reconstructed data.

20. The apparatus according to claim 19, wherein the iterative completion condition comprises at least one of:

- a number of iterations reaching a preset value, or
- a difference between a second set of reconstructed data obtained in a previous iteration and a second set of reconstructed data obtained in a current iteration being no more than a preset threshold.

* * * * *